(12) United States Patent
Sadana et al.

(10) Patent No.: US 11,913,309 B2
(45) Date of Patent: Feb. 27, 2024

(54) FILTRATION MEDIA INCLUDING POROUS POLYMERIC MATERIAL AND DEGRADABLE SHAPE MEMORY MATERIAL

(71) Applicants: Anil Sadana, Houston, TX (US); Ping Duan, Cypress, TX (US)

(72) Inventors: Anil Sadana, Houston, TX (US); Ping Duan, Cypress, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 877 days.

(21) Appl. No.: 16/927,056

(22) Filed: Jul. 13, 2020

(65) Prior Publication Data
US 2022/0010659 A1    Jan. 13, 2022

(51) Int. Cl.
*E21B 43/08*     (2006.01)
*B01D 71/32*     (2006.01)
*B01D 39/16*     (2006.01)

(52) U.S. Cl.
CPC ........ *E21B 43/082* (2013.01); *B01D 39/1676* (2013.01); *B01D 71/32* (2013.01);
(Continued)

(58) Field of Classification Search
CPC . E21B 2200/08; B01D 35/02; B01D 39/1676; B01D 2239/0291; B01D 2239/0407; B01D 2239/0428
See application file for complete search history.

(56) References Cited

U.S. PATENT DOCUMENTS

| 7,828,055 B2 | 11/2010 | Willauer et al. |
| 8,048,348 B2 | 11/2011 | Duan et al. |
| (Continued) | | |

FOREIGN PATENT DOCUMENTS

| CN | 103348097 A | 10/2013 |
| WO | 2011133319 A2 | 10/2011 |
| (Continued) | | |

OTHER PUBLICATIONS

Notification of Transmittal of the Search Report and Written Opinion of the International Searching Authority, Or the Declaration, Application No. PCT/US2021/070836, dated Oct. 25, 2021, 11 pages.

*Primary Examiner* — Tara Schimpf
*Assistant Examiner* — Jennifer A Railey
(74) *Attorney, Agent, or Firm* — CANTOR COLBURN LLP

(57) ABSTRACT

A fluid control device includes a support structure configured to be deployed to a selected location in a borehole, and a filtration medium disposed at the support structure and configured to filter a fluid, the filtration medium configured to be compacted from an initial shape to a compacted shape prior to deployment in the borehole. The filtration medium includes a first polymeric material configured to withstand a temperature at the selected location, the first polymeric material forming a porous structure including a plurality of fluid passages, and a second polymeric material including a shape memory polymer disposed within the fluid passages, the shape memory polymer configured to expand in the plurality of fluid passages and cause the filtration medium to expand in the borehole.

18 Claims, 4 Drawing Sheets

(52) U.S. Cl.
CPC .. *B01D 2201/06* (2013.01); *B01D 2239/0266* (2013.01); *B01D 2325/28* (2013.01); *B01D 2325/32* (2013.01); *E21B 2200/08* (2020.05)

(56) References Cited

U.S. PATENT DOCUMENTS

| | | |
|---|---|---|
| 2008/0296023 A1 | 12/2008 | Willauer |
| 2009/0173497 A1 | 7/2009 | Dusterhoft |
| 2013/0292117 A1 | 11/2013 | Robisson et al. |

FOREIGN PATENT DOCUMENTS

| | | | | |
|---|---|---|---|---|
| WO | 2012099765 A3 | 7/2012 | | |
| WO | WO-2013165668 A1 * | 11/2013 | ............. | E21B 43/08 |
| WO | WO-2020172092 A1 * | 8/2020 | ............. | C09K 8/588 |

* cited by examiner

FILTRATION MEDIA INCLUDING POROUS POLYMERIC MATERIAL AND DEGRADABLE SHAPE MEMORY MATERIAL

BACKGROUND

Various tools are utilized in subterranean operations, such as hydrocarbon exploration, drilling and completion operations, to increase or maximize production efficiency. Sand control devices such as sand screens are utilized to control the ingress of particulate contaminants into production fluid and to aid in stabilizing production formations. Examples of sand control devices include screen assemblies having conformable sleeves or components that are expanded downhole. In some cases, high temperature conditions experienced downhole can affect the performance such sand control devices.

BRIEF DESCRIPTION OF THE INVENTION

An embodiment of a fluid control device includes a support structure configured to be deployed to a selected location in a borehole, and a filtration medium disposed at the support structure and configured to filter a fluid, the filtration medium configured to be compacted from an initial shape to a compacted shape prior to deployment in the borehole. The filtration medium includes a first polymeric material configured to withstand a temperature at the selected location, the first polymeric material forming a porous structure including a plurality of fluid passages, and a second polymeric material including a shape memory polymer disposed within the fluid passages, the shape memory polymer configured to expand in the plurality of fluid passages and cause the filtration medium to expand in the borehole.

An embodiment of a fluid control method includes deploying a fluid control device in a borehole, the fluid control device including a support structure and a filtration medium, the filtration medium being in a compacted shape during deployment, the filtration medium including a first polymeric material configured to withstand a temperature at the selected location, the first polymeric material forming a porous structure including a plurality of fluid passages, and a second polymeric material including a shape memory polymer disposed within the fluid passages. The method also includes expanding the shape memory polymer in the plurality of fluid passages to cause the filtration medium to expand and conform to a surface of the borehole, removing the shape memory polymer from the porous structure, and flowing a fluid through the porous structure and filtering undesirable material from the fluid.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
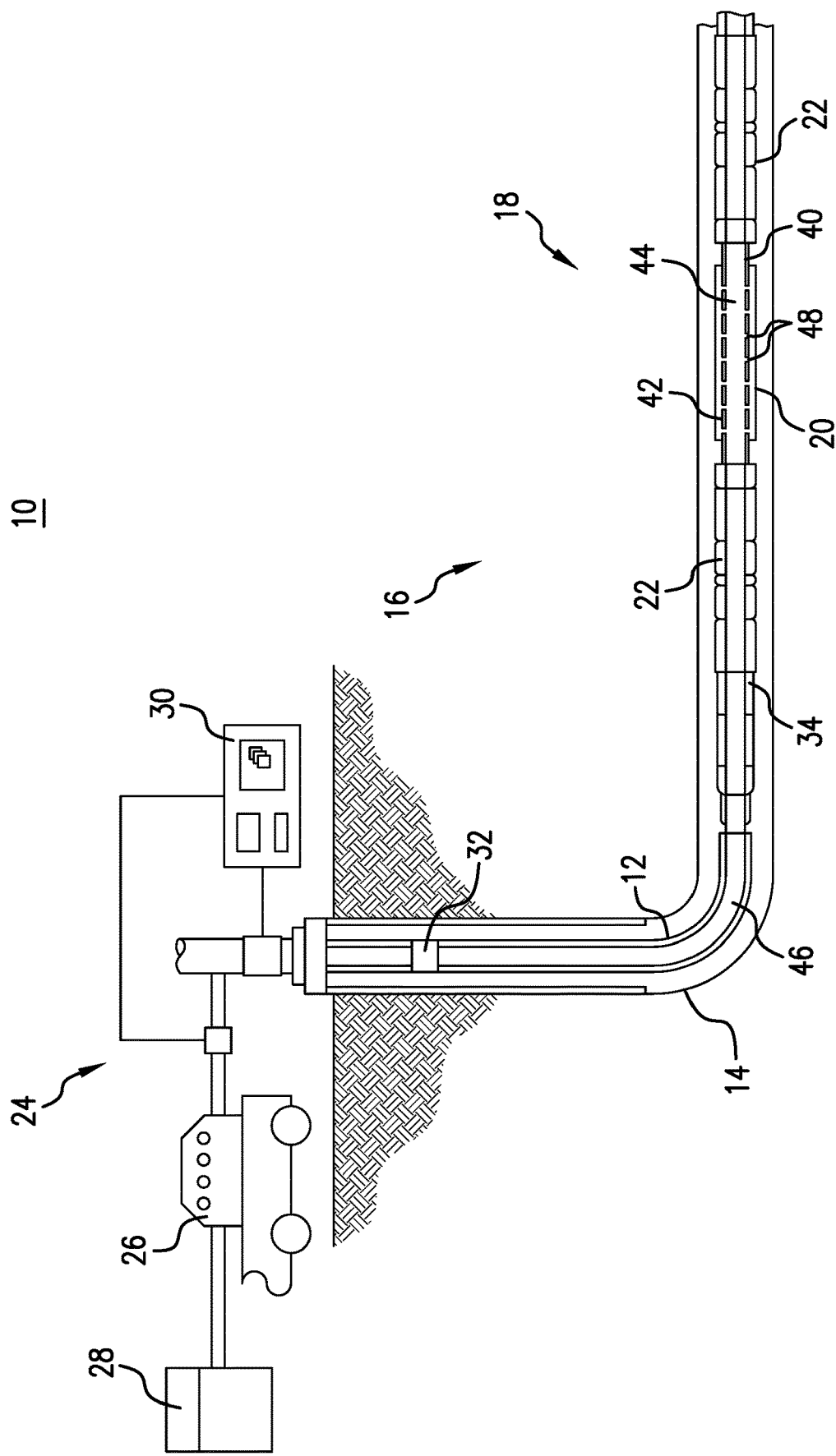
FIG. 1 depicts an embodiment of a downhole completion and/or production system including an expandable and conformable screen assembly.

Devices, systems and methods for controlling sand and other undesirable material in a downhole environment are described herein. An embodiment of a fluid control device or tool includes a screen assembly having a conformable and expandable filtration medium made from a combination of a high temperature chemically resistant polymeric material and a shape memory polymeric material. The high temperature polymeric material forms a porous structure having pores or other fluid passages therein. The shape memory polymeric material is disposed within the pores or other fluid passages. The filtration medium may be compacted from an initial shape to a compacted shape, and expanded downhole by activating the shape memory polymeric material.

In one embodiment, the shape memory polymeric material is degradable such that the shape memory polymeric material can be removed from the filtration medium due to. Degradation may occur in response to existing downhole conditions (e.g., temperature and or borehole fluid composition), or based on injection of a triggering fluid.

A "high temperature," in one embodiment, is a temperature at a downhole environment, such as at least about 100 degrees C. For example, the temperature of a downhole environment can be 120 degrees C. or higher. A high temperature polymer or material is a material that can withstand such a high temperature, i.e., does not significantly degrade during an operation and/or during an operational life of a tool or component including the medium. A "chemically resistant" material is a material that can be used in a downhole environment without significant damage or degradation due to exposure to various fluids and chemicals encountered downhole (including, for example, chemicals entering a borehole from a subterranean region and/or chemicals injected into the borehole).

The high temperature polymeric material (alone or in combination with other materials) is configured as a porous structure, such as an open cell foam, through which fluids can flow. The porous structure acts to filter fluid entering the fluid control device (e.g., production fluid including formation fluids such as oil and hydrocarbon gas), after expansion downhole and removal of the shape memory polymeric material due to degradation.

In use, the filtration medium is deployed downhole in conjunction with a tool or component, such as a screen assembly. Prior to deployment, the filtration medium can be compressed or compacted into a compacted or run-in shape. For example, the filtration medium is heated to a temperature above a glass transition temperature (Tg) of the shape memory polymeric material, compacted and subsequently cooled to retain the compacted shape. The filtration assembly can then be expanded downhole, for example, due to downhole temperatures above the Tg, and/or in response to an activation fluid that reduces the Tg to a temperature below the downhole temperatures.

After expansion, the shape memory polymeric material degrades in the presence of downhole conditions and is leeched from the porous structure to leave open pores (or other fluid passages). The filtration medium may then be used to filter sand, particulates and other undesirable material from production fluid. It is noted that the filtration medium may be configured as one or more layers, either alone or in combination with one or more additional filtration layers or devices, such as perforated sleeves, wire mesh, bead screens and/or others.

Embodiments described herein present a number of advantages. The filtration media and screen assemblies described herein can be used in higher temperature environments than conventional screens and conventional shape memory devices. The filtration media can also be used as an expandable fluid control device that can be deployed for longer periods than conventional screens and shape memory components, and can be a viable alternative to gravel packing systems.

FIG. 1 depicts an example of a system 10 configured to perform a subterranean operation, and illustrates an example of a screen assembly including a conformable and expandable filtration medium. The system 10 in this example is a resource or energy production system 10 that includes a borehole string 12 disposed in a borehole 14 extending into a subterranean region or a resource bearing formation, such as an earth formation 16. It is noted that the filtration medium is not limited to this example, and can be incorporated into any suitable downhole device or component.

The borehole string 12 includes a completion string having a production assembly 18. The production assembly 18 includes a screen assembly 20, and may also include a flow control device such as an inflow control device (ICD). The production assembly 18 may include additional components, such as one or more packer assemblies 22 configured to isolate components and/or zones in the borehole 12.

The system 10 also includes surface equipment 24 such as a drill rig, rotary table, top drive, blowout preventer and/or others to facilitate deploying the borehole string 12, operating various downhole components, monitoring downhole conditions and controlling fluid circulation through the borehole 14 and the borehole string 12. For example, the surface equipment 24 may include a fluid control system 26 including one or more pumps in fluid communication with a fluid tank 28 or other fluid source. The fluid control system 26 facilitates injection of fluids, drilling fluid (e.g., drilling mud), stimulation fluid (e.g., a hydraulic fracturing fluid), gravel slurries, proppant, and others. The fluid control system 26 or other suitable system may be used to inject fluids, such as an activation fluid to cause shape memory recovery, and/or a triggering fluid to cause degradation.

One or more components of the borehole string 12 may be configured to communicate with a surface location (e.g., the surface equipment 24). The communication may be wired or wireless. A processing device such as a surface processing unit 30 and/or a subsurface processing unit 32 and/or 34, which may be disposed in the borehole 14 and connected to one or more downhole components. The processing device may be configured to perform functions such as controlling downhole components, transmitting and receiving data, processing measurement data and/or monitoring operations. The processing device may also control aspects of fluid circulation and injection.

The screen assembly 20 in this embodiment includes a base pipe 40 and an expandable and conformable filtration medium 42. The base pipe 40 defines an inner fluid conduit 44 that can be connected to a borehole string or otherwise in fluid communication with a selected location such as a surface location. For example, the inner fluid 44 is in fluid communication with a production conduit 46 connected to the surface. A plurality of holes or other fluid passages 48 provide fluid paths for fluid entering through the filtration medium 42 (e.g., after degradation and removal of the shape memory polymeric material) to flow through the base pipe 40 and into the inner fluid conduit 44.

The filtration medium 42 includes a first polymeric material formed as a porous structure, and a second polymeric material disposed within pores or fluid passages in the porous structure. The first polymeric material includes a high temperature polymer that can withstand high temperature downhole environments, and is referred to herein as a high temperature polymeric material. The second polymeric material includes a shape memory polymer, which is referred to herein as a shape memory polymeric material or shape memory material. In one embodiment, the shape memory polymeric material includes a degradable shape memory polymer, i.e., a polymer that degrades over some period of time after deployment in a subterranean and/or after exposure to an activation fluid. An example of a suitable shape memory material is a polyurethane material.

In one embodiment, the high temperature polymeric material is resistant to chemical reaction and/or degradation due to chemicals found in downhole environments. As described herein, a "chemically resistant" material is a material that does not significantly degrade in the presence of chemical substances found or introduced downhole (e.g., hydrocarbons, gases, etc.), at least for a period of time that exceeds a desired length of an operation and/or a desired useful life of the filtration medium 42. The high temperature polymeric material made be made from any suitable polymeric material, which may include a single polymer, a combination of polymers, or a combination of a polymer and other materials (e.g., another polymer and/or a filler).

The high temperature polymeric material may be selected from any of a variety of materials. For example, the high temperature polymeric material may be made from one or more fluoropolymers, thermoplastic materials, epoxies, high temperature engineering plastics, or a combination thereof. Examples of fluoropolymers include fluorinated ethylene propylene (FEP), perfluoroalkoxy polymer (PFA), polytetrafluoroethylene (PTFE) and others. Examples of other suitable materials include polyphenylsulfone (PPSU), polyarylsulfone (PSU), self-reinforced polyphenylene (SRP), Polyether ether ketone (PEEK) and others.

As noted above, the high temperature polymeric material is configured to be resistant to temperatures found in downhole environments. In one embodiment, the high temperature polymeric material can be deployed in environments up to at least about 300 degrees F. For example, the high temperature polymeric material is selected or configured to withstand temperatures of at least about 250 degrees F. or 120 degrees C. The high temperature resistance of this material, in combination with shape memory properties of the shape memory material, allow for an expandable and conformable screen assembly or device that can be effectively used in higher temperature environments as compared to conventional screens and conventional shape memory polymers.

The shape memory material is or includes a shape memory polymer, such as a polyurethane. The shape memory material is disposed within pores and/or fluid passages formed within the porous polymer material. The shape memory material allows the filtration medium 42 to be compressed prior to deployment, and expanded downhole. The filtration medium 42 can thus be effectively used in harsh downhole environments, due to the high temperature and chemical resistance of the first polymer material, while exhibiting shape memory properties that allow the filtration medium 42 to be compressed and later expanded.

When the filtration medium 42 is compressed at a temperature above the glass transition temperature of the shape memory material, both the high temperature polymeric material and the shape memory material are reduced in volume. After decrease of the temperature below its glass transition temperature, the shape memory material retains its shape and thereby fixes the shape and volume of the entire filtration medium 42. When temperature is increased to above the glass transition temperature, the shape and volume are expanded and the filtration medium 42 recovers all or part of the original the shape and volume. In one embodiment, the glass transition temperature is above a subterranean temperature, such as above about 100 degrees C. (e.g., at or above about 120 degrees C.).

In one embodiment, the shape memory material is a degradable material. A "degradable" material is a material that breaks down or degrades when deployed in a subterranean environment. This degradation may be due to exposure to downhole conditions, such as high temperature and/or chemical substances encountered or introduced downhole. In one embodiment, degradation may be triggered by introducing a fluid (a triggering fluid) that degrades the shape memory material or increases the rate of degradation. Degradation of the shape memory material causes it to eventually be removed (e.g., via displacement due to fluids such as drilling mud and/or production fluid), leaving the porous structure defined by the high temperature polymeric material to function as a filtration medium.

The shape memory material may be selected from any suitable material or combination of materials. In one embodiment, the material includes a shape memory polymer such as a polyurethane. Other materials that can be used as the shape memory material include polyamides, polyureas, polyvinyl alcohols, vinyl alcohol-vinyl ester copolymers, phenolic polymers, polybenzimidazoles, polyethylenes, and/or others. Other suitable materials include cross-linked polymers. Materials that may be selected are not limited to the embodiments described herein, as other materials may be selected based on considerations such as downhole temperature, types of substances encountered downhole, the rate of degradation in a given condition, etc.

It is noted that the porous structure formed by the high temperature polymeric material may take any form that provides fluid paths that allow fluid to enter a production conduit or other location. Examples of such forms include closed cell foam, foam having both open and closed cells, a lattice, interweaved fibers or other elongated members, perforated plates or sleeves, and others.

In one embodiment, after the filtration medium 42 is deployed in a compacted shape, the filtration medium 42 can be expanded by introducing an activation fluid. The activation fluid lowers the glass transition temperature of the shape memory material to below a selected temperature (e.g., a downhole temperature), resulting in recovery of all or part of an original shape. For example, the activation fluid is configured to reduce the glass transition temperature to below about 250-300 degrees F., or other temperature level or range encountered downhole. The activation fluid is selected based on considerations including downhole temperature and desired transition temperature.

The activation fluid may be a water based fluid, such as a brine or water based drilling mud, or an oil based fluid. The fluid is configured to activate the medium 42 and expand it by lowering the Tg temporarily so that downhole temperature causes expansion. Various chemical additives may be included to control aspects of activation, including activation temperature and the rate of expansion. Examples of activation fluids include dimethyl sulfoxide, ketones, alcohols, glycols, ethers, and combinations thereof.

Figure 2A:
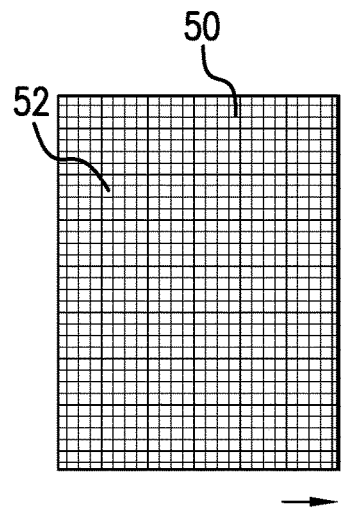
FIGS. 2A-2F depict an example of a conformable and expandable filtration medium and show various states of the filtration medium during manufacture and operation.
Figure 2B:
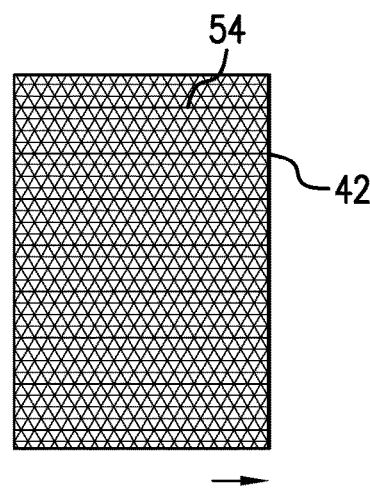

FIGS. 2A-2F depict an example of the filtration medium 42 and illustrates various states of the filtration medium 42 (or components thereof) during manufacture and deployment. FIG. 2A shows a porous structure 50 made from a high temperature polymer such as PTFE. The porous structure 50 defines a plurality of fluid passages 52 that allow fluid to flow therethrough. For example, the porous structure 50 is an open cell foam and the fluid passages 52 are pores. FIG. 2B shows the filtration medium 42 after a shape memory polymer 54 is introduced into the fluid passages 52. The shape memory polymer 54 may be introduced in any suitable manner. For example, liquid polymer (e.g., polyurethane) is injected into the porous structure 50 and allowed to solidify.

Although the shape memory polymer 54 is shown as being introduced after formation of the porous structure 50, embodiments described herein are not so limited. For example, the porous structure 50 and the shape memory polymer 54 may be formed together, e.g., by mixing high temperature polymer material with beads or particles of the shape memory polymer 54 and forming the mixture as an integral body.

Figure 2C:
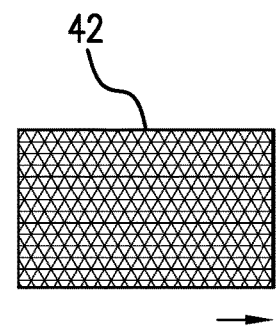
Figure 2D:
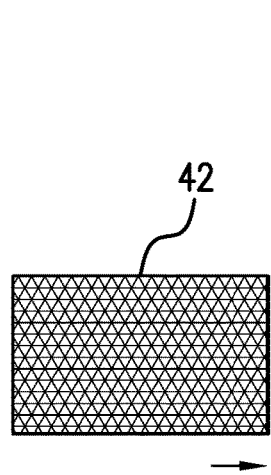

The filtration medium 42 may be compacted from an initial shape (as shown in FIG. 2B) to a compacted or run-in shape (as shown in FIG. 2C). When in this shape, the filtration medium 42 can be deployed with a screen assembly or other component. Referring to FIG. 2D, the filtration medium 42 retains this shape as long as the temperature of the filtration medium 42 is below the glass transition temperature (Tg) of the shape memory polymer 54.

Figure 2E:
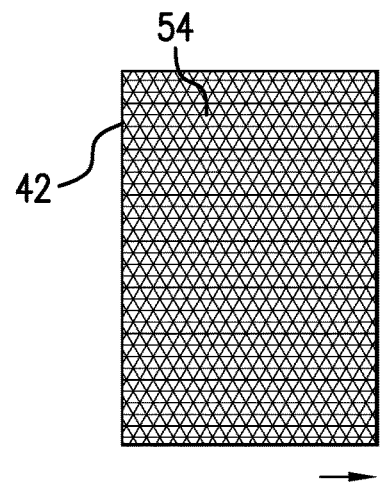
Figure 2F:
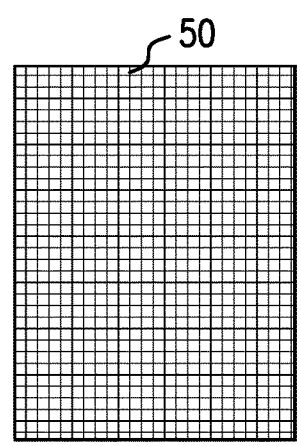

As shown in FIG. 2E, when the filtration medium 42 is heated above the glass transition temperature (e.g., when deployed in a borehole), the shape memory polymer 54 in the fluid passages 52 expands, causing the filtration medium 42 to fully or partially recover the initial shape. After a period of time (which commences upon exposure to a high temperature environment or upon exposure to a triggering fluid), the shape memory polymer degrades and is removed, leaving the porous structure 50, as shown in FIG. 2F.

Although embodiments are discussed in the context of sand control and as part of the system 10, it is to be understood that the embodiments are not so limited. The medium 42 may be configured for any desired downhole application (or surface application) and thus have any suitable shape, size, material composition and chemical composition.

The porous structure 50 can be manufactured in a number of ways. One example is a sacrificial method in which the high temperature polymeric material is processed to create a selected porosity by mixing or blending the thermoplastic material with a sacrificial filler. Porosity is created by subsequently dissolving or otherwise removing the filler to create pores. Another example involves heating the material to a liquid or pliable state and blowing air or other gases to create bubbles or voids. In yet another example, glass spheres or other hollow bodies are blended with the material, followed by solidification and application of a compressive force to break the hollow bodies.

Figure 3:
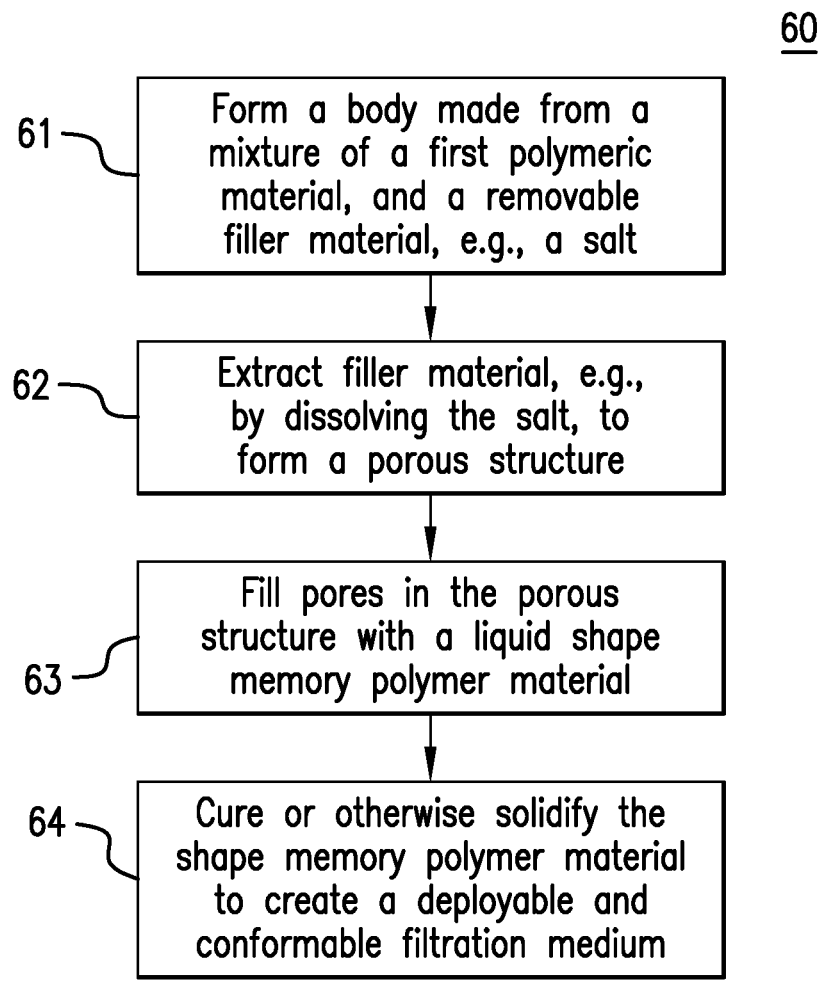
FIG. 3 is a flow diagram depicting an embodiment of a method of manufacturing a conformable filtration medium and/or a fluid control device.

FIG. 3 depicts an embodiment of a method 60 of manufacturing an expandable and conformable filtration medium, such as the filtration medium 42. The method 60 includes one or more stages 61-64. In one embodiment, the method 60 includes the execution of all of stages 61-64 in the order described. However, certain stages may be omitted, stages may be added, or the order of the stages changed.

At stage 61, a high temperature polymeric material is formed into a body having a selected size and shape. For example, powdered high temperature polymeric material (e.g., PTFE or PEEK) or beads of the material are mixed with a dissolvable substance such as a salt. The salt may be in a particulate form, and the size of the particles may be selected based on the desired pore size or porosity. In addition, the ratio between the amount of the thermoplastic material and the amount of salt can be selected based on the desired porosity. For example, powdered PTFE and powdered salt are mixed with a proportion of about 60% salt (e.g., 30 g) and about 40% PTFE (e.g., 20 g).

The mixture is preformed to a desired shape, such as a hollow cylindrical shape configured to be disposed on a base pipe. The mixture is then fused and sintered together at a suitably high temperature to create an integrated body.

At stage 62, the salts are then extracted from the integrated body. For example, the salt is extracted and dissolved by use of water at elevated temperature under pressure, leaving a porous structure such as an open cell foam.

At stage 63, the pores (or other fluid passages) are filled with a liquid shape memory polymeric material. For example, the porous structure is put in a vacuum, and liquid curable polyurethane material is introduced and pulled into the pores under the vacuum.

At stage 64, the shape memory polymeric material is solidified to form the filtration medium 42. For example, the liquid polyurethane material is cured to form solid shape memory material in the pores.

The filtration medium 42 may be part of a screen device or assembly that includes additional layers or filtration components. For example, the screen assembly 20 may be made from one or more layers of the porous medium 42, in combination with one or more additional filtration elements or layers, such as metal screens, wire mesh, polymeric screens, mesh wool, bead screens, perforated sleeves and/or others.

Figure 4:
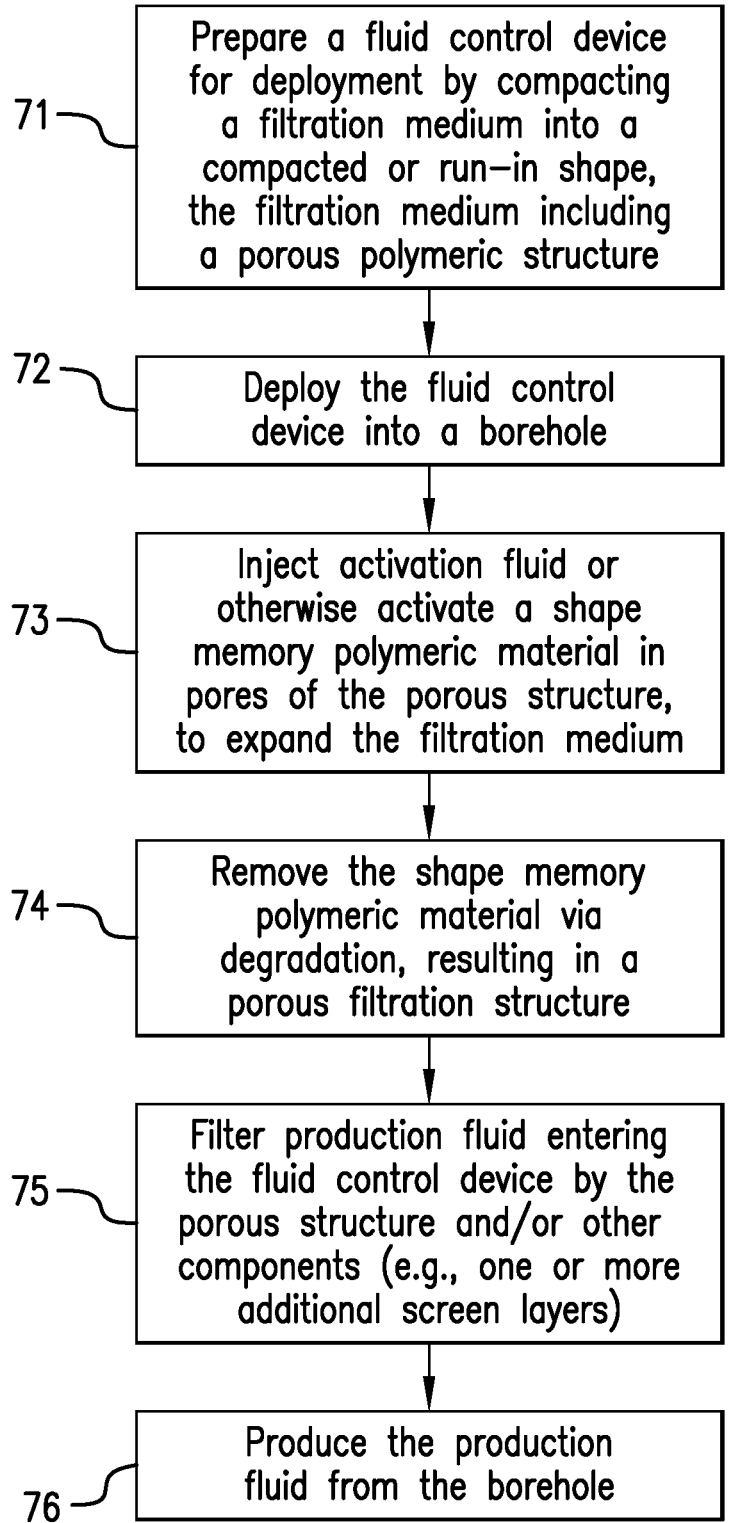
FIG. 4 is a flow diagram depicting a method of controlling fluid flow in a borehole, and/or performing aspects of a downhole or subterranean operation.

FIG. 4 illustrates a method 70 of controlling particulates such as produced sand in a borehole. The method is performed in conjunction with a fluid control device or tool such as the screen assembly 20. The method 70 includes one or more stages 71-76. In one embodiment, the method 70 includes the execution of all of stages 71-76 in the order described. However, certain stages may be omitted, stages may be added, or the order of the stages changed. Although the method 70 is described in conjunction with the screen assembly 20, the method can be utilized in conjunction with any suitable fluid control device or system.

In the first stage 71, at fluid control device or apparatus, such as the screen assembly 20 is prepared for deployment. A filtration medium such as the medium 42 including a high temperature polymeric material and a shape memory material as described herein (e.g., the medium or conformable sleeve) is disposed on a support structure, and is compacted from an initial shape to a smaller diameter shape (a compacted or run-in shape) at a temperature above the Tg of the medium.

In the second stage 72, the device is deployed to a subterranean environment via a borehole. For example, the screen assembly 20 in the compacted state is deployed in the borehole 14 to a selected location, such as a production zone. At this stage, the Tg of the porous medium is above the temperature at the selected subterranean location.

In the third stage 73, the filtration medium 42 is activated to cause the medium to expand into an expanded state, in which some or all of the initial or run-in shape is recovered. For example, the screen assembly 20 and the filtration medium 42 is activated by the high temperature environment in the borehole. Alternatively, the filtration medium 42 is activated by injecting an activation fluid, such as a water-brine or oil-based liquid, to lower the Tg. The activation fluid causes the Tg of the shape memory material to fall below the downhole temperature, which causes the shape memory material to expand, thereby expanding pores in the structure formed by the high temperature polymeric material, and expanding the filtration medium 42 to conform to a surface of the borehole 14.

In the fourth stage 74, the shape memory polymeric material is fully or partially removed from the filtration medium 42 via degradation. For example, the shape memory material is made from polyurethane, which degrades downhole, or another suitable material. After a certain period of time, the shape memory material breaks down and is leeched from the filtration medium 42 (e.g., by production fluid entering the filtration medium and forcing the degraded polymer material out), leaving a porous structure, such as the porous structure 50.

In the fifth stage 75, production is commenced, and fluid from the subterranean region is drawn through the porous structure. For example, fluid from the formation 16 is drawn through the porous structure 50 to filter out sand and other undesirable material. In the sixth stage 76, production fluid including fluid from the formation is produced at the surface.

Embodiments described herein provide an effective means to control sand and prevent undesired materials from entering a production string or being produced. The devices described herein can be configured to operate effectively at a wide range of temperatures, including temperatures higher than those at which conventional sand control devices operate. In addition, the filtration medium described herein can be scaled to accommodate various sizes of tubulars and other components.

Set forth below are some embodiments of the foregoing disclosure:

Embodiment 1: A fluid control device comprising: a support structure configured to be deployed to a selected location in a borehole; and a filtration medium disposed at the support structure and configured to filter a fluid, the filtration medium configured to be compacted from an initial shape to a compacted shape prior to deployment in the borehole, the filtration medium including: a first polymeric material configured to withstand a temperature at the selected location, the first polymeric material forming a porous structure including a plurality of fluid passages; and a second polymeric material including a shape memory polymer disposed within the fluid passages, the shape memory polymer configured to expand in the plurality of fluid passages and cause the filtration medium to expand in the borehole.

Embodiment 2: The device of any prior embodiment, wherein the shape memory polymer is configured to degrade and be removed from the fluid passages after expansion of the filtration medium.

Embodiment 3: The device of any prior embodiment, wherein the shape memory polymer is configured to degrade in response to exposure to a triggering fluid.

Embodiment 4: The device of any prior embodiment, wherein the shape memory polymer has a glass transition temperature that is less than a downhole temperature at the selected location.

Embodiment 5: The device of any prior embodiment, wherein the shape memory polymer has a glass transition temperature that is greater than a downhole temperature at the selected location, the shape memory polymer configured to be activated by a triggering fluid configured to reduce the glass transition temperature to a level that is below the downhole temperature.

Embodiment 6: The device of any prior embodiment, wherein the glass transition temperature is greater than about 100 degrees C.

Embodiment 7: The device of any prior embodiment, wherein the first polymeric material is resistant to degradation due to chemical substances in the borehole.

Embodiment 8: The device of any prior embodiment, wherein the porous structure is a foam and the fluid passages include pores formed by the porous structure.

Embodiment 9: The device of any prior embodiment, wherein the fluid control device is part of a screen assembly configured to filter production fluid entering the borehole, the support structure including a tubular having a fluid conduit defined therein, the filtration medium being at least one layer disposed on an outer surface of the tubular and at least partially surrounding the tubular.

Embodiment 10: The device of any prior embodiment, wherein the first polymeric material includes a fluoropolymer.

Embodiment 11: A fluid control method comprising: deploying a fluid control device in a borehole, the fluid control device including a support structure and a filtration medium, the filtration medium being in a compacted shape during deployment, the filtration medium including a first polymeric material configured to withstand a temperature at the selected location, the first polymeric material forming a porous structure including a plurality of fluid passages, and a second polymeric material including a shape memory polymer disposed within the fluid passages; expanding the shape memory polymer in the plurality of fluid passages to cause the filtration medium to expand and conform to a surface of the borehole; removing the shape memory polymer from the porous structure; and flowing a fluid through the porous structure and filtering undesirable material from the fluid.

Embodiment 12: The method of any prior embodiment, wherein removing the shape memory polymer includes degrading the shape memory polymer over a period of time.

Embodiment 13: The method of any prior embodiment, wherein the shape memory polymer is degraded based on exposure to a triggering fluid injected into the borehole.

Embodiment 14: The method of any prior embodiment, wherein the shape memory polymer has a glass transition temperature that is less than a downhole temperature at the selected location.

Embodiment 15: The method of any prior embodiment, wherein the shape memory polymer has a glass transition temperature that is greater than a downhole temperature at the selected location, and expanding the shape memory polymer includes introducing an activation fluid to reduce the glass transition temperature to a level that is below the downhole temperature.

Embodiment 16: The method of any prior embodiment, wherein the glass transition temperature is greater than about 100 degrees C.

Embodiment 17: The method of any prior embodiment, wherein the first polymeric material is resistant to degradation due to chemical substances in the borehole.

Embodiment 18: The method of any prior embodiment, wherein the porous structure is a foam and the fluid passages include pores formed by the porous structure.

Embodiment 19: The method of any prior embodiment, wherein the fluid control device is part of a screen assembly configured to filter production fluid entering the borehole, the support structure including a tubular having a fluid conduit defined therein, the filtration medium being at least one layer disposed on an outer surface of the tubular and at least partially surrounding the tubular.

Embodiment 20: The method of any prior embodiment, wherein the first polymeric material includes a fluoropolymer, the fluoropolymer selected from at least one of fluorinated ethylene propylene (FEP), perfluoroalkoxy polymer (PFA), and polytetrafluoroethylene (PTFE).

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A fluid control device comprising:
a support structure configured to be deployed to a selected location in a borehole; and
a filtration medium disposed at the support structure and configured to filter a fluid, the filtration medium configured to be compacted from an initial shape to a compacted shape prior to deployment in the borehole, the filtration medium including:
a first polymeric material configured to withstand a temperature at the selected location, the first polymeric material forming a porous structure including a plurality of fluid passages, wherein the fluid passages include pores defined by the porous structure; and
a second polymeric material including a shape memory polymer disposed within the fluid passages and filling the pores defined by the porous structure of the first polymeric material, the shape memory polymer configured to expand in the plurality of fluid passages and cause the filtration medium to expand in the borehole, wherein the shape memory polymer is configured to retain the compacted shape of the filtration medium prior to expansion of the shape memory polymer.

2. The device of claim 1, wherein the shape memory polymer is configured to degrade and be removed from the fluid passages after expansion of the filtration medium.

3. The device of claim 1, wherein the shape memory polymer is configured to degrade in response to exposure to a triggering fluid.

4. The device of claim 1, wherein the shape memory polymer has a glass transition temperature that is less than a downhole temperature at the selected location.

5. The device of claim 1, wherein the shape memory polymer has a glass transition temperature that is greater than a downhole temperature at the selected location, the shape memory polymer configured to be activated by a triggering fluid configured to reduce the glass transition temperature to a level that is below the downhole temperature.

6. The device of claim 5, wherein the glass transition temperature is greater than about 100 degrees C.

7. The device of claim 1, wherein the first polymeric material is resistant to degradation due to chemical substances in the borehole.

8. The device of claim 1, wherein the fluid control device is part of a screen assembly configured to filter production fluid entering the borehole, the support structure including a tubular having a fluid conduit defined therein, the filtration medium being at least one layer disposed on an outer surface of the tubular and at least partially surrounding the tubular.

9. The device of claim 1, wherein the first polymeric material includes a fluoropolymer.

10. A fluid control method comprising:
deploying a fluid control device in a borehole, the fluid control device including a support structure and a filtration medium, the filtration medium being in a compacted shape during deployment, the filtration medium including a first polymeric material configured to withstand a temperature at the selected location, the first polymeric material forming a porous structure including a plurality of fluid passages, wherein the fluid passages include pores defined by the porous structure, and a second polymeric material including a shape memory polymer disposed within the fluid passages and filling the pores defined by the porous structure of the first polymeric material, wherein the shape memory polymer is configured to retain the compacted shape of the filtration medium prior to expansion of the shape memory polymer;
expanding the shape memory polymer in the plurality of fluid passages to cause the filtration medium to expand and conform to a surface of the borehole;
removing the shape memory polymer from the porous structure; and
flowing a fluid through the porous structure and filtering undesirable material from the fluid.

11. The method of claim 10, wherein removing the shape memory polymer includes degrading the shape memory polymer over a period of time.

12. The method of claim 10, wherein the shape memory polymer is degraded based on exposure to a triggering fluid injected into the borehole.

13. The method of claim 10, wherein the shape memory polymer has a glass transition temperature that is less than a downhole temperature at the selected location.

14. The method of claim 10, wherein the shape memory polymer has a glass transition temperature that is greater than a downhole temperature at the selected location, and expanding the shape memory polymer includes introducing an activation fluid to reduce the glass transition temperature to a level that is below the downhole temperature.

15. The method of claim 14, wherein the glass transition temperature is greater than about 100 degrees C.

16. The method of claim 10, wherein the first polymeric material is resistant to degradation due to chemical substances in the borehole.

17. The method of claim 10, wherein the fluid control device is part of a screen assembly configured to filter production fluid entering the borehole, the support structure including a tubular having a fluid conduit defined therein, the filtration medium being at least one layer disposed on an outer surface of the tubular and at least partially surrounding the tubular.

18. The method of claim 10, wherein the first polymeric material includes a fluoropolymer, the fluoropolymer selected from at least one of fluorinated ethylene propylene (FEP), perfluoroalkoxy polymer (PFA), and polytetrafluoroethylene (PTFE).

\* \* \* \* \*